(No Model.)
N. C. HESTON.
FISHING LINE DRIER.
No. 531,938. Patented Jan. 1, 1895.
FIG. 1
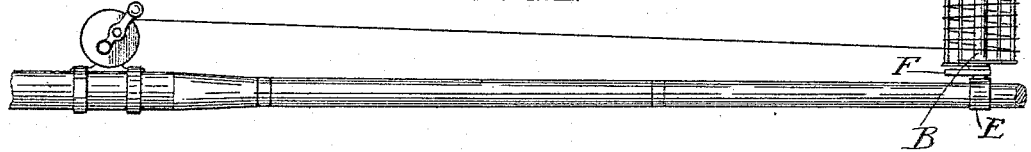
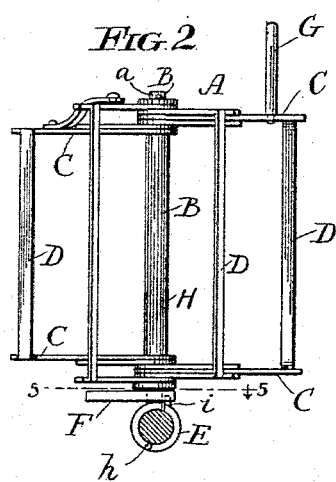
FIG. 2
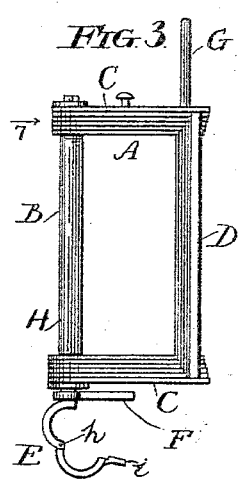
FIG. 3
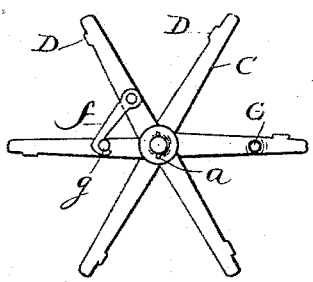
FIG. 4
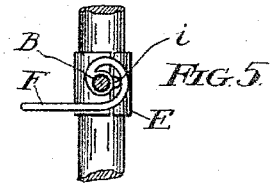
FIG. 5
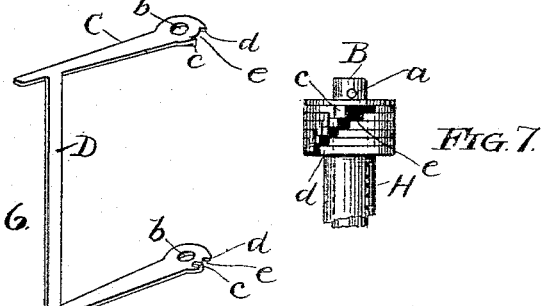
FIG. 6   FIG. 7
Witnesses:
Louis Herman
Sidney H. Linnry
Inventor:
Nathan C. Heston

UNITED STATES PATENT OFFICE.

NATHAN C. HESTON, OF CHICAGO, ILLINOIS.

FISHING-LINE DRIER.

SPECIFICATION forming part of Letters Patent No. 531,938, dated January 1, 1895.

Application filed May 4, 1894. Serial No. 510,020. (No model.)

*To all whom it may concern:*

Be it known that I, NATHAN C. HESTON, a citizen of the United States, residing at Chicago, in the county of Cook and State of Illinois, have invented certain new and useful Improvements in Fishing-Line Driers, of which the following is a specification.

My invention relates to improvements in fishing line driers and has for its object to provide a fishing line drier of such construction that it may be quickly attached to a fishing rod, the fishing line wound upon it in such manner as to expose it to the air to dry thoroughly and admit of its being readily returned to the reel.

A further object of my invention is to provide a device that may be readily detached from the fishing rod and folded into a comparatively small space for convenience in carrying, also the employment of the fishing rod as a support for the line drier while in use.

The objects and advantages of the invention will be fully understood from the following description and claims when taken in conjunction with the drawings, in which—

Figure 1— is a lateral view of a portion of a fishing rod provided with an ordinary fishing reel, fishing line and my fishing line drier with a small quantity of line wound upon it. Fig. 2— is a lateral view of the line drier with cylindrical clamp around a cross section of a fishing rod. Fig. 3— is a lateral view of the line drier folded and with cylindrical clamp open. Fig. 4— is a view of the arms composing the outer end of the line drier with hook for holding it open. Fig. 5— is a view of the cylindrical clamp nearly closed around a broken section of rod, with cam lever and stud in contact. Fig. 6— is a perspective view of two arms and a cross bar, constituting one section of the line drier. Fig. 7— is a set of section-arm ends, the outer end of the shaft and casing or tube, with lugs and shoulders in section-arm ends for opening and closing the drier.

In said drawings similar letters designate corresponding parts throughout the several views, referring to which—

A, indicates a combination of six sections forming a folding reel, which is designed to rotate smoothly upon the shaft B where it is kept in position by the pin $a$ passing through the shaft. The sections of the combination or series are each formed with two outwardly extending arms C, connected by a cross bar D near their outer extremities, the cross bar of the outer section being slightly longer than that of the section next in series, while that of the second is slightly longer than that of the third and similarly, each cross arm is longer than the one of the section inside of it, upon the shaft. This arrangement admits of all the sections being folded together in compact form when not in use, as shown in Fig. 3. The inner ends of the section-arms are perforated at $b$ for the reception of the shaft B and are also provided with the lug $c$ and shoulder $d$, the lug on the inner side of the section arm. The opening $e$ in the edge of the arms between the lug $c$ and shoulder $d$ has a circumferential length equal to one sixth part of the circle described by the lug in one complete revolution around the shaft. The opening mentioned serves as a passage for the lug of the preceding arm in series, allowing it to move in a rotary direction only the length of the opening, or one sixth part of a circle. Thus, rotating the first arm in series one sixth of a circle brings the lug in contact with the shoulder of the second arm in series and a continued movement engages each arm in series in a like manner, until all the arms are brought into equal relative positions. The hook $f$ attached to the inner section can then engage the pin $g$ upon the outer section, holding all the sections open in the form of a reel.

The shaft B is formed integral with one section of the cylindrical clamp E and is designed to support the sections of the folding reel A and cam-lever F, its free end being perforated for the reception of the key pin $a$.

The cylindrical clamp E is composed of two semi-circular parts, one end of each being formed into the respective parts of a hinged joint and connected by the pin $h$ passing through holes for its reception in each part of the joint. One part of the clamp forms the base or seat of the shaft B, while the other part is provided with the extension or stud $i$ which acts in connection with the cam lever F in locking the parts of the clamp together. The shaft B and stud $i$ are located at points opposite the hinged joint and the clamp when closed forms a wide ring or band.

The cam-lever F, is a cam consisting of a lever-arm winding from a central point slightly outward or eccentrically, thence tangentially. At a central point the cam-lever is provided with a circular aperture for the reception of the shaft B upon which it may, when unobstructed, swing freely around; but when the stud $i$ is brought into contact with it the stud is drawn inwardly, closing and locking the clamp.

In Fig. 3, G designates a handle attached to the outer section-arm for rotating the reel.

Referring to Fig. 6, the section-arms and cross bar are shown as being formed of one piece of metal. This manner of construction is preferable in point of strength, although, if desired, the cross bar and arms may be formed separately, the ends of the bars made to pass through holes in the arms and secured by soldering or riveting.

A tube or casing H incloses the shaft between the inner and outer ends of the sections to keep them compact, or the same result may be obtained by passing pins through the shaft close to the inner section of the series.

Six sections have been illustrated in the drawings and foregoing description as constituting the folding reel or line drier, whereas a greater or less number of sections may be used, if desired, by forming the space $e$ in accordance. Thus, in using three sections the space required would be one third of a circle; for four sections, one fourth of a circle; for eight sections, one eighth of a circle and the same principle applies to any required number of sections.

In operation the folding reel or line drier is attached to the fishing rod at a point where the taper of the rod conforms to the size of the clamp, by passing the clamp around it and locking it by means of the cam-lever F and stud $i$. The sections are then opened and secured by means of the hook $f$ and pin $g$. The line which is to be dried is stored upon the ordinary reel from which the end is passed and tied to a cross arm of the line drier. By means of the handle G, the folding reel is revolved rapidly, until the line has been wound upon it. When desired, the line is simply reeled back on to the ordinary reel, the line drier detached from the rod and folded into small space convenient to carry.

The device is made of metal throughout.

What I claim as my invention, and desire to secure by Letters Patent, is—

1. The combination in fishing line driers, substantially as described, of a folding reel composed of a series of sections, pivoted upon a shaft, a shaft or bearing for the sections, a cylindrical clamp or clasp consisting of a wide hinged ring or band and a cam-lever consisting of a lever arm winding from a central point slightly outward or eccentrically, thence tangentially, perforated at a central point and pivoted upon the shaft, with a fishing rod, reel and line.

2. The combination in fishing line driers, substantially as described, of a folding reel designed to rotate smoothly upon a shaft or bearing, composed of sections formed each of two outwardly extending arms connected near their outer extremities by a cross bar, the arms perforated near their inner ends for the reception of the shaft and provided with a lug and shoulder with a space or opening between them, a shaft or bearing for the folding reel, a clamp, a cam-lever, with a fishing rod, reel and line.

3. The combination in fishing line driers, substantially as described, of a folding reel pivoted upon a shaft and held in position by a key pin and a series of sections composing the reel provided each with a lug and shoulder, the lug upon the inner side of the section-arm, an opening between the lug and shoulder which has a circumferential length in accordance with the number of sections composing the reel, a shaft, a clamp, a cam-lever, with a fishing rod, reel and line.

4. The combination in fishing line driers, substantially as described, of a folding reel designed to rotate on a shaft or bearing having a perforation to admit a key pin, a clamp composed of two semi-circular parts, one end of each being formed into respective parts of a hinged joint and connected by a pin passing through them, with a cam-lever pivoted on the shaft and engaging a stud upon the free section of the clamp, a fishing rod, reel and line.

5. The combination in fishing line driers, substantially as described, of a folding reel, shaft and a cylindrical clamp composed of two semi-circular parts hinged together, one of the parts being formed integral with the shaft which projects from the end opposite the hinged joint, the other part formed with an extension or stud upon it at relatively the same point, with a cam-lever for engaging the said stud, a fishing rod, reel and line.

NATHAN C. HESTON.

Witnesses:
LOUIS HERMAN,
SYDNEY H. FINNEY.